United States Patent
Balduccini et al.

(10) Patent No.: US 8,161,063 B2
(45) Date of Patent: Apr. 17, 2012

(54) MULTIMEDIA OBJECT RETRIEVAL FROM NATURAL LANGUAGE QUERIES

(75) Inventors: Marcello Balduccini, Penfield, NY (US); Sara Girotto, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 312 days.

(21) Appl. No.: 12/557,543

(22) Filed: Sep. 11, 2009

(65) Prior Publication Data

US 2011/0066630 A1 Mar. 17, 2011

(51) Int. Cl.
G06F 7/00 (2006.01)
G06F 17/30 (2006.01)

(52) U.S. Cl. ............... 707/766; 707/769; 707/E17.009; 707/E17.014; 715/716; 715/777; 704/9

(58) Field of Classification Search ............ 707/766, 707/769, 802, 915, E17.005, E17.044, E17.108, 707/E17.009, E17.014; 715/716, 777; 704/9
See application file for complete search history.

(56) References Cited

U.S. PATENT DOCUMENTS

| | | | |
|---|---|---|---|
| 5,493,677 A * | 2/1996 | Balogh et al. | 707/999.104 |
| 5,761,655 A * | 6/1998 | Hoffman | 707/999.003 |
| 5,895,464 A * | 4/1999 | Bhandari et al. | 704/9 |
| 6,199,034 B1 * | 3/2001 | Wical | 704/9 |
| 6,233,547 B1 | 5/2001 | Benber | |
| 7,668,405 B2 * | 2/2010 | Gallagher | 382/305 |
| 2004/0098379 A1 * | 5/2004 | Huang | 707/3 |
| 2006/0041591 A1 * | 2/2006 | Rhoads | 707/104.1 |
| 2006/0112141 A1 * | 5/2006 | Morris | 707/104.1 |
| 2006/0136556 A1 * | 6/2006 | Stevens et al. | 709/203 |
| 2007/0239778 A1 * | 10/2007 | Gallagher | 707/104.1 |
| 2008/0140644 A1 * | 6/2008 | Franks et al. | 707/5 |
| 2008/0304808 A1 * | 12/2008 | Newell et al. | 386/52 |
| 2009/0119333 A1 * | 5/2009 | Sundstrom et al. | 707/104.1 |
| 2009/0192968 A1 * | 7/2009 | Tunstall-Pedoe | 707/E17.139 |
| 2010/0106573 A1 * | 4/2010 | Gallagher et al. | 705/14.4 |
| 2011/0025710 A1 * | 2/2011 | Kennedy et al. | 707/E17.108 |
| 2011/0066630 A1 * | 3/2011 | Balduccini et al. | 707/766 |

OTHER PUBLICATIONS

James W. Cooper & Roy J. Byrd—"OBIWAN—A Visual Interface for Prompted Query Refinement"—System Science—1998, Proceedings of the Thirty-First International Conference on Sytem Sciences—Jan. 6-9, 1998 vol. 2 (pp. 277-285).*

Hans Christian Boas—"From the field to the Web: Implementing Best-Practice Recommendations in Documentary Linguistics"—Language Resources and Evaluation—vol. 40, No. 2 (pp. 153-174), Oct. 12, 2006.*

(Continued)

*Primary Examiner* — John E Breene
*Assistant Examiner* — Anh Ly
(74) *Attorney, Agent, or Firm* — Kevin E. Spaulding

(57) ABSTRACT

A method for identifying multi-media assets from a multi-media collection, and the method implemented at least in part by a data processing system and comprising the steps of: receiving a search query, the search query, or a derivative thereof, including a possessive phrase, wherein the possessive phrase includes a possessor and a possession category; identifying a denoted object referred to by the possessive phrase using a predefined relationship database that establishes social relationships between objects; identifying one or more additional possessors of the denoted object using the predefined relationship database; generating one or more additional possessive phrases for the denoted objects relating the identified additional possessors to the denoted object; and identifying one or more multi-media assets from the multi-media collection containing the denoted object responsive to the one or more additional possessive phrases.

12 Claims, 5 Drawing Sheets

OTHER PUBLICATIONS

Marcello Balduccini, Chitta Baral and Yulia Lierler, "Knowledge Representation and Question Answering," in Handbook of Knowledge Representation, Eds. Vladimir Lifschitz, Frank van Hamelen and Bruce Porter (Elsevier, 2008).

James R. Curran, Stephen Clark, and Johan Bos, "Linguistically Motivated Large-Scale NLP with C&C and Boxer," Proceedings of the ACL 2007 Demonstrations Session, pp. 29-32 (2007).

Michael Gelfond and Vladimir Lifschitz, Classical Negation in Logic Programs and Disjunctive Databases.: New Generation Computing, vol. 9, pp. 365-385 (1991).

Dan Moldovan, Christine Clark. Sanda Harabagiu, Steven Maiorano, "COGEX: a Logic Prover for Question Answering," Proceedings of the 2003 Conference of the North American Chapter of the Association for Computational Linguistics on Human Language Technology, pp. 87-93 (2003).

Dan Moldovan and Vasile Rus. "Transformation of WorldNet Glosses into Logic Forms," Proceedings of FLAIRS 2001.

Soon Ae Chun,"SNePS Implementation of Possessive Phrases. SNeRG," Technical Note #19, Department of Computer Sciences, State University of New York at Buffalo (1987).

* cited by examiner

```
0 HEAD
1 SOUR REUNION
2 VERS V8.0
2 CORP LEISTER PRODUCTIONS
1 DEST REUNION
1 DATE 25 AUG 2009
1 SUBM @SUB1@
1 FILE PATENTTREE
1 GEDC
2 VERS 5.5
1 CHAR IBM WINDOWS
0 @I1@ INDI
1 NAME JOHN /SMITH/
1 SEX M
1 BIRT
2 DATE 1 NOV 1961
1 FAMC @F3@
1 FAMS @F1@
1 CHAN
2 DATE 25 AUG 2009
0 @I2@ INDI
1 NAME SUSAN /BROWN/
1 SEX F
1 BIRT
2 DATE 19 OCT 1961
1 FAMC @F4@
1 FAMS @F1@
1 CHAN
2 DATE 25 AUG 2009
0 @I3@ INDI
1 NAME CINDY /SMITH/
1 SEX F
1 BIRT
2 DATE 2 JAN 1991
1 FAMC @F1@
1 CHAN
2 DATE 25 AUG 2009
0 @I4@ INDI
1 NAME DAVE /SMITH/
1 SEX M
1 BIRT
2 DATE 14 SEP 1937
1 FAMS @F3@
1 CHAN
2 DATE 25 AUG 2009
1 NAME PAM /JONES/
1 SEX F
1 BIRT
2 DATE 14 APR 1938
1 FAMS @F3@
1 CHAN
2 DATE 25 AUG 2009
0 @I6@ INDI
1 NAME GREG /BROWN/
1 SEX M
1 BIRT
2 DATE 27 AUG 1930
1 FAMS @F4@
1 CHAN
2 DATE 25 AUG 2009
0 @I7@ INDI
1 NAME KATHY /DAVIS/
1 SEX F
1 BIRT
2 DATE 3 JAN 1933
1 FAMS @F4@
1 CHAN
2 DATE 25 AUG 2009
0 @SUB1@ SUBM
1 NAME JOHN SMITH
0 @F1@ FAM
1 HUSB @I1@
1 WIFE @I2@
1 MARR
2 DATE 22 JUN 1985
1 CHIL @I3@
0 @F3@ FAM
1 HUSB @I4@
1 WIFE @I5@
1 MARR
2 DATE 22 AUG 1959
1 CHIL @I1@
0 @F4@ FAM
1 HUSB @I6@
1 WIFE @I7@
1 MARR
2 DATE 18 SEP 1954
1 CHIL @I2@
0 TRLR
```

MULTIMEDIA OBJECT RETRIEVAL FROM NATURAL LANGUAGE QUERIES

FIELD OF THE INVENTION

This invention relates to retrieving multimedia objects, and more particularly to retrieving multimedia object by means of natural language queries and social network information.

BACKGROUND OF THE INVENTION

People's collections of electronically stored multimedia objects (also called assets) are constantly growing, and so is the need to quickly organize and search through them. Examples of multimedia objects would include digital photographs, digital video files and digital audio files. One of the most natural ways to do so is by queries in natural language. The queries can be used to search through the textual descriptions that the user has provided for the objects. Alternatively, it is possible to search through automatically generated textual description based e.g. on image and face recognition. Thus, one may retrieve photographs related to Christmas by specifying the search string "Christmas."

This type of approach has been investigated extensively. For example, it is described for in U.S. Pat. No. 5,493,677 by Balogh et al., entitled "Generation, Archiving and Retrieval of Digital Images with Evoked Suggestion-Set Captions and Natural Language Interface" and U.S. Pat. No. 6,233,547 by M. Debner, entitled "Computer Program Product for Retrieving Multi-Media Objects Using a Natural Language Having a Pronoun". It is also used in most state-of-the-art Internet search engines, such as google (www.google.com) and bing (www.bing.com).

The simplest of such approaches (e.g. google's search engine) look for matches between words from the query and the words in each description, and augment the technique by taking into account a list of synonyms (e.g. currently, in google, the query "U.S.A." also matches "University of St. Augustine"). The most advanced approaches apply natural language techniques in order to understand the meaning of both query and description, and then use some form of inference to see if their meanings match. So, for example they can tell that there is a match between the query "Frank on a plane" and the description "Frank in the cockpit", while there is no match between "Frank on a plane" and "Frank stepping on his paper plane".

To complicate matters, the interpretation of the descriptions provided for multimedia assets often requires external knowledge. This is particularly important when knowledge about social networks is involved. For example, consider a social network in which John is Sara's boss, and is also Cindy's father. The query "Sara's supervisor" obviously matches the asset description "Cindy with her dad", but only if the knowledge from the social network is taken into account. This situation is particularly common in multimedia collections about families, where, for example, "Frank's father" may also be "Jim's grandfather".

None of the search techniques mentioned above takes into account social network information in the matching process.

Consequently, a need exists for a retrieval system that takes into account social network information in the matching process.

SUMMARY OF THE INVENTION

The present invention provides a method for identifying multi-media assets from a multi-media collection, and the method implemented at least in part by a data processing system and comprising the steps of:

receiving a search query, the search query, or a derivative thereof, including a possessive phrase, wherein the possessive phrase includes a possessor and a possession category;

identifying a denoted object referred to by the possessive phrase using a predefined relationship database that establishes social relationships between objects;

identifying one or more additional possessors of the denoted object using the predefined relationship database;

generating one or more additional possessive phrases for the denoted objects relating the identified additional possessors to the denoted object; and identifying one or more multi-media assets from the multimedia collection containing the denoted object responsive to the one or more additional possessive phrases.

The present invention has the advantage that multi-media assets can be identified even when the multi-media assets are not tagged with information that directly pertains to the search query.

It has the additional advantage that it substantially increases the increases the likelihood that a relevant multimedia asset will be identified using a particular search query.

It has the further advantage that pre-processing can be used to resolve ambiguous search queries and search queries including non-standard possession categories.

BRIEF DESCRIPTION OF THE DRAWINGS

The present invention will be more readily understood from the detailed description of exemplary embodiments presented below considered in conjunction with the attached drawings, of which:

FIG. 4 illustrates a gedcom file representing the individuals and relationship in the social network of FIG. 3.

DETAILED DESCRIPTION OF THE INVENTION

In the following description, embodiments of the present invention often are described as a software program. Those skilled in the art will readily recognize that the equivalent of such software may also be constructed in hardware or firmware.

Figure 1:
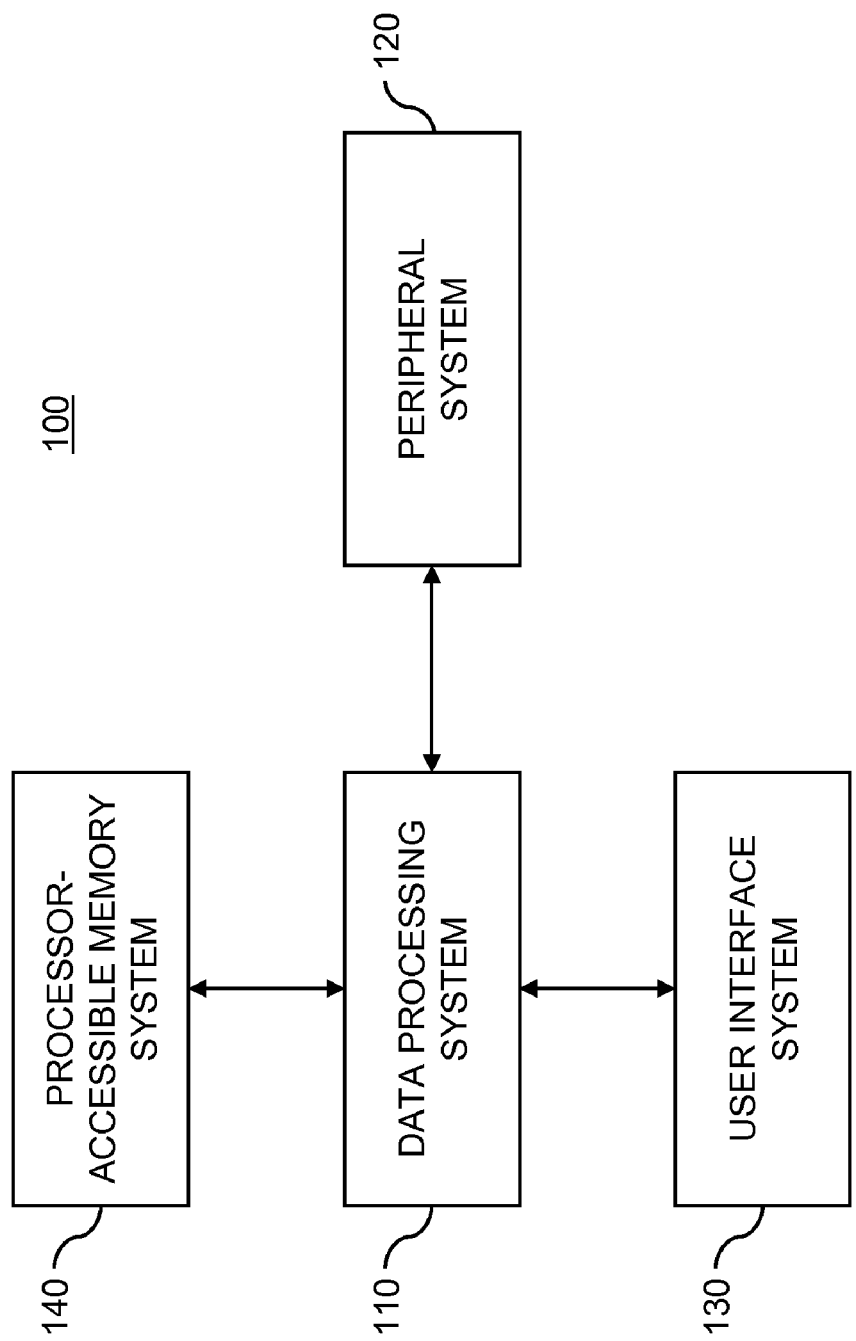
FIG. 1 illustrates a data processing system and its interfacing components, according to an embodiment of the present invention.

FIG. 1 illustrates a system 100 for implementing the various embodiments of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110.

Figure 2:
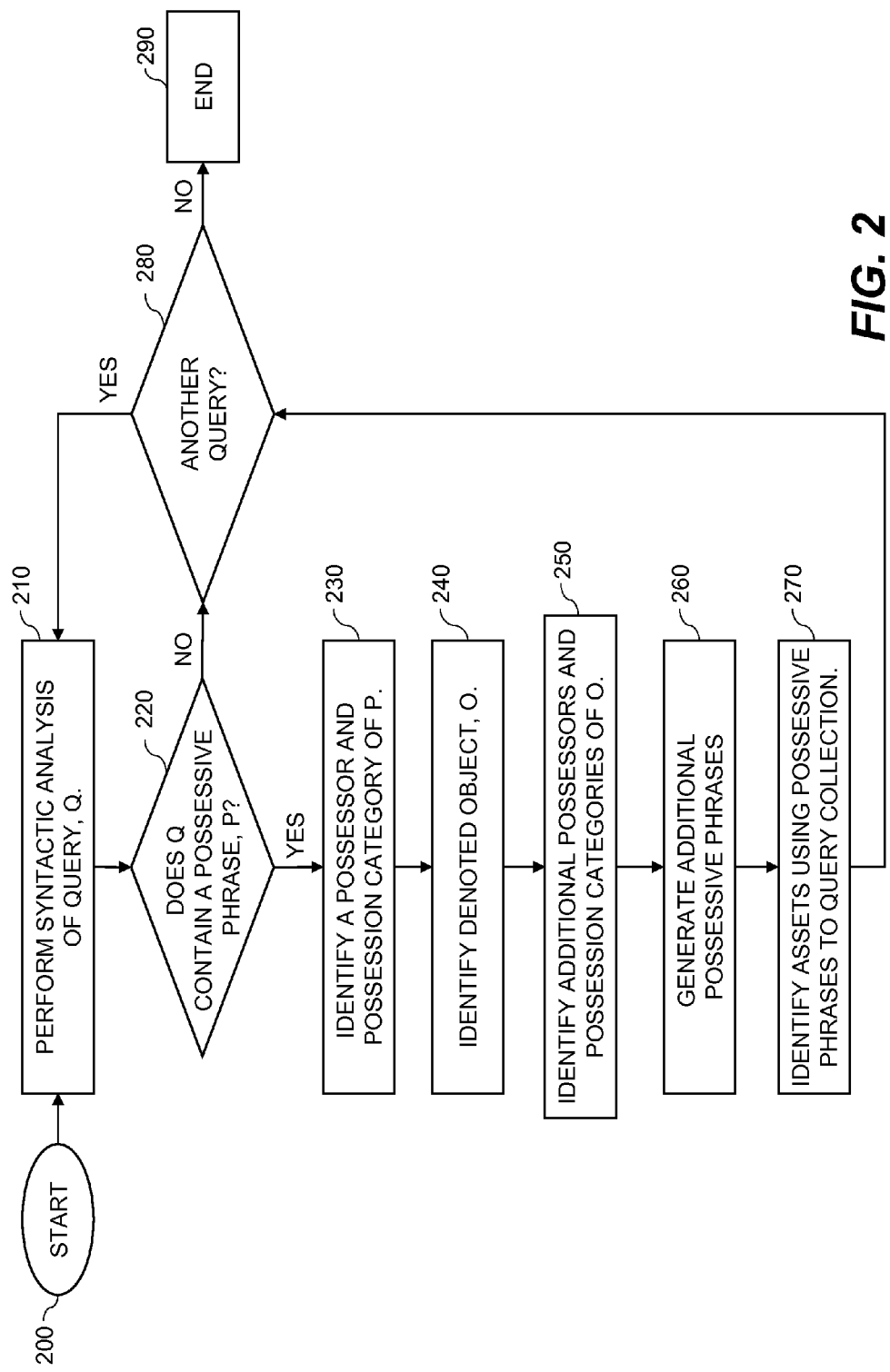
FIG. 2 illustrates a flowchart of a method for retrieving multimedia objects from a collection by means of search queries, according to an embodiment of the present invention.

The data processing system 110 includes one or more data processing devices that implement the processes of the various embodiments of the present invention, including the example process of FIG. 2. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device or component thereof for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention, including the example process of FIG. 2 described herein. The processor-accessible memory system 140 may be a distributed processor-accessible memory system including multiple processor-accessible memories communicatively connected to the data processing system 110 via a plurality of computers and/or devices. On the other hand, the processor-accessible memory system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the processor-accessible memory system 140 even though the user interface system 130 and the processor-accessible memory system 140 are shown separately in FIG. 1.

FIG. 2 illustrates a flowchart of a method for processing queries according to an embodiment of the present invention. According to this method, possessive phrases in the query are identified and, using the information from a user-provided social network, are matched to the possessive phrases in the description of the multimedia assets.

The data processing system 110 (FIG. 1), when executing the process illustrated by FIG. 2, takes as input (1) a search query containing at least a possessive phrase, (2) a pre-defined social network specifying relationships between objects, and (3) a collection of multimedia assets with associated asset descriptions, and outputs the multimedia assets whose descriptions contain possessive phrases that match the search query with respect to the information contained in the social network.

By social network we mean a relationship database that establishes social relationships, such as kinship/interpersonal, location, possession, and part-whole, between objects. (Note that the term "object" in this usage is inclusive of both objects, individuals, and sets thereof.) It is useful to illustrate social networks using directed graphs having nodes corresponding to individuals and objects of interest and relationship arcs corresponding to relationships of interest that are labeled accordingly.

Figure 3:
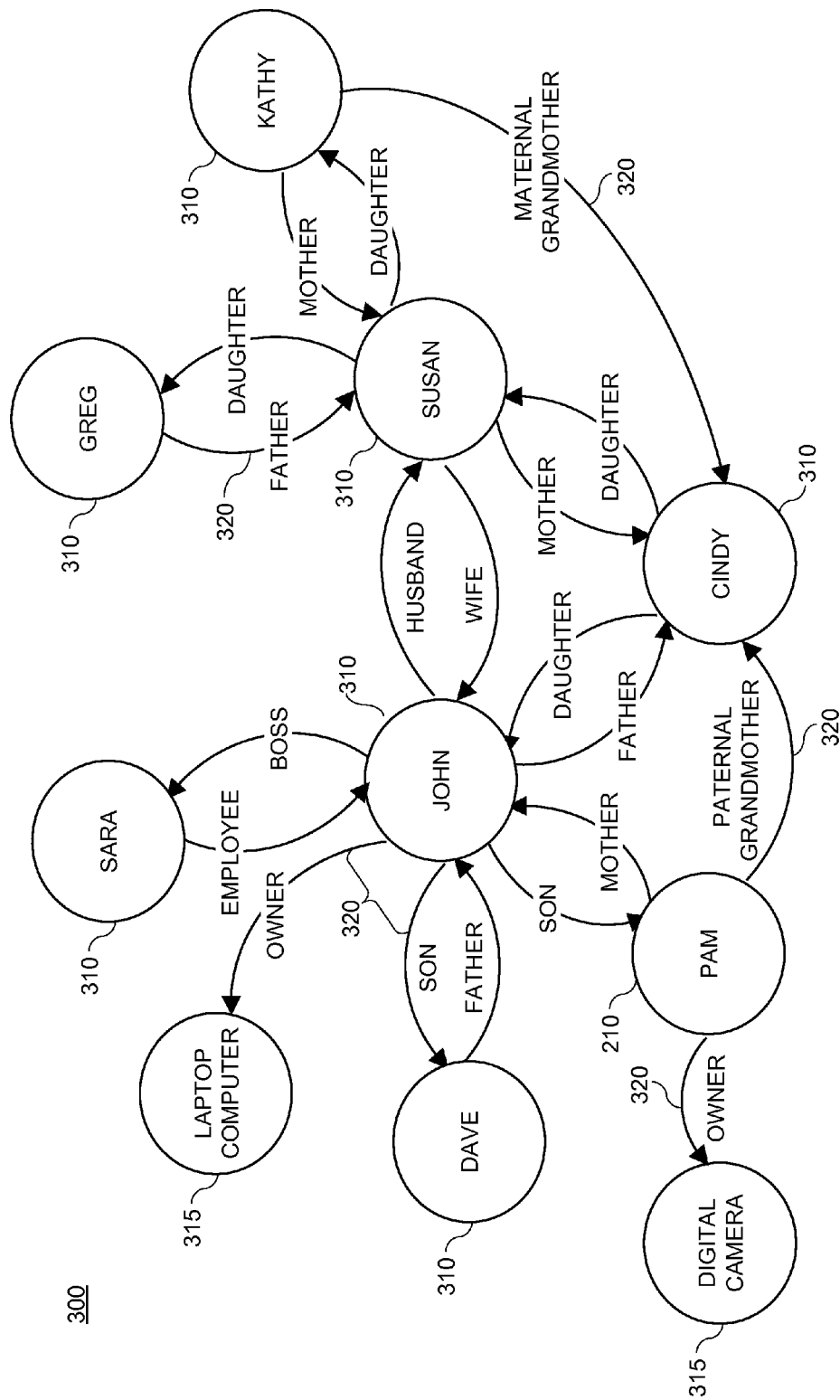
FIG. 3 illustrates a directed graph representing an example of a social network.

An example directed graph representing a social network 300 is shown in FIG. 3. The social network 300 includes a series of object nodes 310 corresponding to individuals (Sara, Greg, Dave, John, Susan, Kath, Pam and Cindy) and object nodes 315 corresponding to inanimate objects (laptop computer and digital camera). The object nodes 310 and 315 are connected by relationship arcs 320 that indicate the relationship between the individuals and objects. For example a relationship arc labeled "owner", directed from object node "John" to object node "laptop computer," is a representation of the fact that "John is the owner of a laptop computer." similarly, relationship arc "father" directed from "John" to "Cindy" means that John is Cindy's father. Note that a given pair of individual/object nodes can be connected by more than one relationship arc. For example, a second relationship arc "daughter" directed from "Cindy" to "John" means that Cindy is John's daughter.

A relationship database describing a social network for use in the present invention can be formed in many ways. In a preferred embodiment of the present invention, a user will define object nodes in a relationship database corresponding to individuals and other objects that are commonly present in their multi-media collection. They will then assign possession categories to link pairs of object nodes. Special software can be provided to aid the user in creating the relationship database. The software can provide a convenient user interface for identifying and linking the nodes. In certain cases, the software can define additional possession categories linking the object nodes. For example, if a user is defining a relationship database corresponding to the social network shown in FIG. 3, the user may assign a possession category of "husband" linking node "John" to node "Susan." The software can then infer that Susan is the wife of John, and can automatically assign a possession category of "wife" linking node "Susan" to node "John." Similarly, if node "Susan" is linked to node "Cindy" using the possession category "mother" and if node "Kathy" is linked to node "Susan" using the possession category "mother," then the software can infer that Kathy is the maternal grandmother of Cindy and can assign a possession category of "maternal grandmother" linking node "Kathy" to node "Cindy." The software can be configured to automatically form such inferred linkages or can be configured to present them to the user for confirmation that the inferences are correct.

In another embodiment of the present invention, a family tree database created using a genealogy software application such as Family Tree Maker or Reunion can be used to aid in the formation of the relationship database. These applications typically create a family tree database in a proprietary format that defines relationships between family members. The family tree database can be used directly as the relationship database for the present invention if the proprietary format of the family tree database is understood. Alternately, most genealogy software applications are enabled to export a family tree database in the well-known portable genealogy file format known as a "gedcom" file. The software used to implement the present invention can be configured to import "gedcom" files and build a corresponding relationship database. FIG. 4 shows an example of a gedcom file 390 containing the individuals and family relationships shown in the social network of FIG. 3.

By possessive phrase we mean primarily a phrase that specifies a social relationship such as "Cindy's father", "John's laptop", here denoted by the term s-form. In a phrase of this form, we identify a possessor, such as "Cindy" in the phrase "Cindy's father", and a possession category, such as "father" in the phrase "Cindy's father." Possessive phrases can also come in alternative forms, such as "Cindy and her father". Those skilled in the art will promptly see that such alternative forms can be translated to the form of interest to the present invention by means of a pre-processing step based on off-the-shelf techniques, such as those described in U.S. Pat. No. 6,233,547 by M. Denber entitled "Computer Program Product for Retrieving Multi-Media Objects Using a Natural Language Having a Pronoun," which is incorporated herein by reference. For this reason, we focus the present description on s-forms.

Returning to the process in FIG. 2, a start step 200 initiates processing of a search query Q. The data processing system 110 (FIG. 1) takes the search query Q and uses a perform syntactic analysis step 210 to analyze the search query Q. In a preferred embodiment of the present invention, perform syntactic analysis step 210 uses an off-the-shelf natural language processing system to analyze the query. Any natural language processing system can be used (e.g., the natural language system available from Language Computer Corporation of Richardson, Tex. or Johan Bos' Boxer system described in the paper "Linguistically Motivated Large-Scale NLP with C&C and Boxer," by James R. Curran, Stephen Clark, and Johan Bos, published in the Proceedings of the ACL 2007 Demonstrations Session, pp. 29-32 (2007)), as long as it returns information suitable for identifying possessive phrases. For example, the Language Computer Corporation system would produce, for an input containing the phrase "Cindy's father", a representation such as "cindy_NN(x1) & father_NN(x2) & of_IN(x2,x1)", where the possessive phrase can be readily detected by the component "of_IN(x2, x1)". The result of the analysis is then stored in the processor-accessible memory system 140 (FIG. 1).

Next a contain possessive phrase test step 220 is used to analyze the result of the perform syntactic analysis step 210 to determine whether the search query Q contains a possessive phrase. For example, in the output produced by the Language Computer Corporation system, the data processing system 110 (FIG. 1) will identify "of_IN(x2,x1)" as the marker of a possessive phrase. If no possessive phrase is found, the process moves on to "get query" step 280, where it accepts another query, if one is available for processing. If instead a possessive phrase P is found, then the data processing system 110 (FIG. 1) proceeds to identify possessor and possession category step 230, which identifies in the possessive phrase P, a possessor S, and a possession category C, and stores them in the processor-accessible memory system 140 (FIG. 1). For example, if the possessive phrase P is "Cindy's father", then the possessor S is "Cindy" and the possession category C is "father". Given the output produced by the system by Language Computer Corporation show above, the data processing system 110 (FIG. 1) will extract the nouns associated with x1 and x2 as, respectively, possessor S and possession category C. Those skilled in the art will promptly recognize that resolution of synonyms can be easily performed here, if it has not already been done by the natural language processing system during the perform syntactic analysis step 210. For example, the possession category "dad" can be mapped to the possession category "father."

Next identify denoted object step 240 utilizes information from a social network SN to determine the object denoted by the possessor S and the possession category C. This is accomplished by identifying in the social network SN, the node corresponding to possessor S, and locating a relationship arc labeled by possession category C and directed from some other node corresponding to denoted object O to the node corresponding to the possessor S. Denoted object O is thus selected to be a denoted object, and stored in the processor-accessible memory system 140 (FIG. 1). To better understand the "identify denoted object" step 240, consider the example shown in FIG. 2 in which the social network (SN) 300 contains a relationship arc labeled "father", directed from node "John" to node "Cindy" (representing the information that John is Cindy's father). Thus, at identify denoted object step 240, (1) the node corresponding to "Cindy" is identified; (2) the relationship arc labeled "father" directed from "John" to "Cindy" is identified; and (3) "John" is stored as denoted object O.

It is important to notice that some possessive phrases may be ambiguous, in that they may denote multiple objects. For example, with reference to the social network 300 in FIG. 3, "Cindy's grandma" identifies both Cindy's maternal grandmother (Kathy) and Cindy's paternal grandmother (Pam). Those skilled in the art will readily recognize that the ambiguity can be resolved by applying a pre-processing step to the query that translates any ambiguous possessive phrases into a set of queries, each containing an unambiguous possessive phrase, e.g. "Cindy's grandma" is translated to the set of two queries "Cindy's maternal grandmother" and "Cindy's paternal grandmother."

Next, an identify additional possessors and possession categories step 250 is used to examine the social network SN to identify other possessors and possession categories of denoted object O. This is accomplished by finding the relationship arcs directed from denoted object O to some other node S'. For each such relationship arc, with a label C' and directed to some node S', S' and C' are taken to represent, respectively, another possessor and possession category of denoted object O. Referring to the example shown in FIG. 3, recall that we have already identified node "John" as the denoted object of the possessive phrase "Cindy's father." Social network 300 also contains a relationship arc directed from node "John" to node "Sara", with label "boss". Thus, identify additional possessors and possession categories step 250 concludes that "Sara" is another possessor for "John", with possession category "boss". Similarly, additional possessors and possession categories step 250 would also conclude that "Dave" is a possessor with possession category "son," "Pam" is a possessor with possession category "son," "Susan" is a possessor with possession category "husband," and "Laptop Computer" is a possessor with possession category "owner."

Next, generate additional possessive phrases step 260 generates additional possessive phrases for the identified additional possessor and possession categories. This can be accomplished by means of the same list of synonyms already used by the identify possessor and possession category step 230. For both the possessor and the possession category, all available synonyms are identified, and suitably combined in s-form possessive phrases. For example, given that "supervisor" is a synonym of "boss", possessor "Sara" and possession category "boss" would yield, among others, the possessive phrases "Sara's boss" and "Sara's supervisor".

The set of possessive phrases is then used by identify assets step 270 as queries for the retrieval from the collection of multimedia assets. In a preferred embodiment of the present invention, the identify assets step 270 uses an off-the-shelf search technique, such as the one described in U.S. Pat. No. 5,493,677 by Balogh et al., entitled "Generation, Archiving, and Retrieval of Digital Images with Evoked Suggestion-Set Captions and Natural Language Interface," which is incorporated herein by reference.

Figure 5:
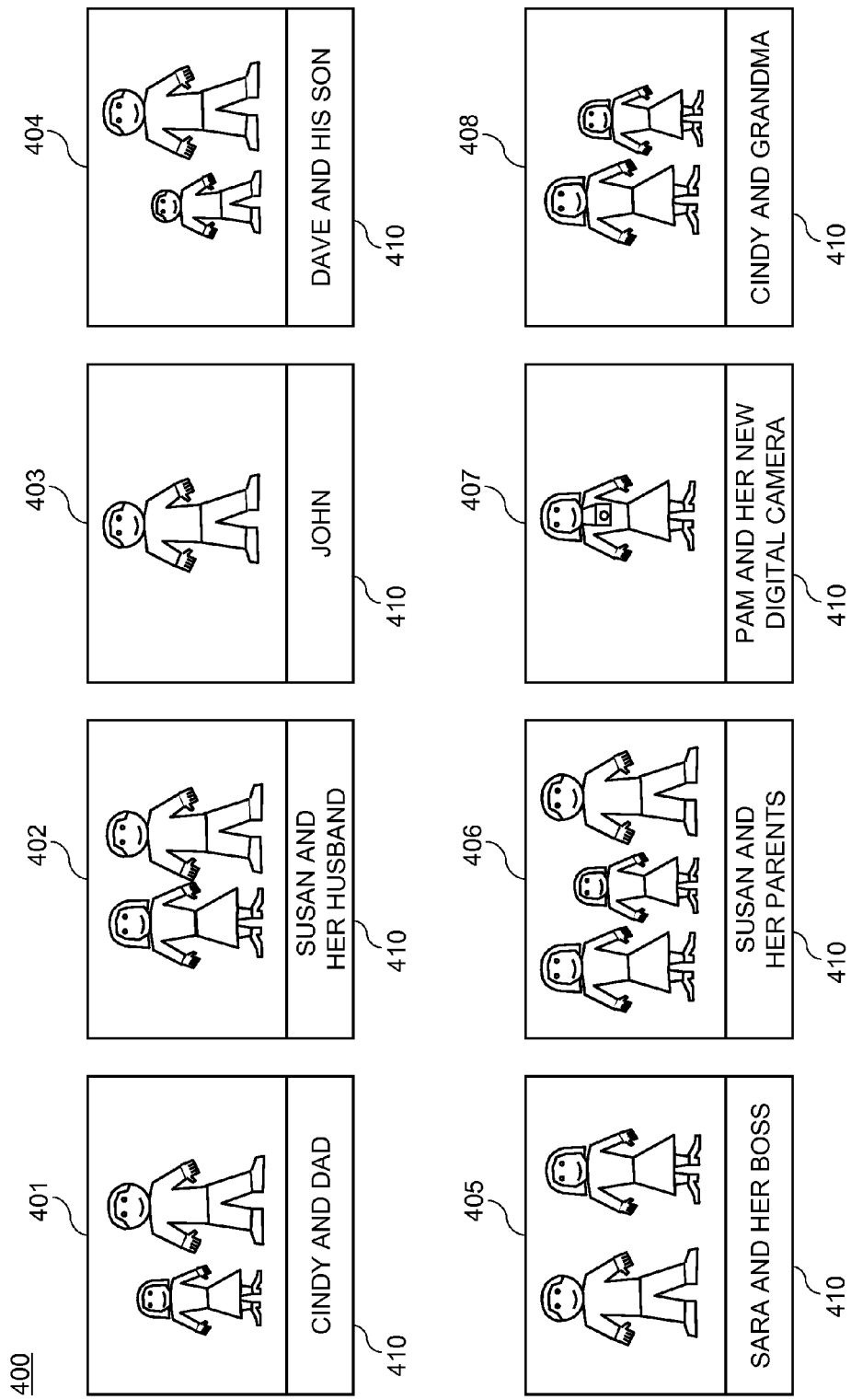
FIG. 5 illustrates an example of a multi-media collection containing a set of digital image assets.

FIG. 5 shows an example of a multimedia collection 400 containing a series of digital image files 401-408. Captions 410 have been entered for each of the images and stored as metadata in the digital image files. If a search query included the possessive phrase "Cindy's father," digital image file 401 having the caption "Cindy and Dad" can be identified using conventional techniques since it is labeled with information that corresponds directly to the possessive phrase. In this example, the identify denoted object step 230 will determine that "John" is denoted object corresponding to "Cindy's Father." Digital image file 402 can therefore also be identified as containing the denoted object. Applying the method of the present invention will generate a plurality of additional possessive phrases for the denoted object including "Susan's husband," "Dave's son," and "Sara's boss" which can then be used to identify digital image file 402, digital image file 404 and digital image file 405, respectively, as also containing the denoted object, wherein the additional digital image files 402, 404 and 405 are identified by comparing the additional possessive phrases to metadata associated with multimedia assets in the multimedia collection 400.

Finally, the get query step 280 looks for another query and, if found, returns to perform syntactic analysis step 210 using the next query. If no additional queries are found, execution terminates at end step 290.

In a preferred embodiment of the present invention, one or more multi-media assets are identified, at least in part, using an answer set program, where, according to the definition provided by Michael Gelfond and Vladimir Lifschitz in the article "Classical negation in logic programs and disjunctive databases", New Generation Computing, Vol. 9, pp. 365-385 (1991), an "answer set program" is a set of rules, and a "rule" is a statement of the form:

$$h \leftarrow 1_1, \ldots 1_m, \text{not } 1_{m+1}, \ldots \text{not } 1_n \qquad (1)$$

where h and $1_i$'s are first order literals and "not" is the so-called default negation, known in the art. The informal meaning of the above rule is that, if $1_1$ through $1_m$ are true and if there is no reason to believe any of $1_{m+1}$ through $1_n$, then h must be true.

An answer set program is used to perform steps 230 through 270 as follows. First, an asset is selected, for which the system needs to determine if the asset's description matches the query. Then, the possessor $p_Q$ and possession category $c_Q$ are extracted from a possessive phrase in the query following the steps described above. Similarly, possessor $P_D$ and possession category $c_D$ are extracted from a possessive phrase in the asset's description. Next, an answer set program Π is constructed by combining:

1. The social network, encoded by first-order atoms of the form:
    possession_category(object, possessor)
    e.g. father(mary, john) would indicated that John is Mary's father.

2. The rules:
    ¬ subset(descr, query)←$c_D$(Y,$p_D$), not $c_Q$(Y, $p_Q$)
    subset(descr, query)←not ¬subset(descr, query)
    ←not subset(descr, query)

The first rule detects whether there are objects corresponding to the possessive phrase from the description that are not identified by the possessive phrase in the query. If that is the case, the atom ¬subset(descr, query) becomes true. The intuitive meaning of the atom is "the objects denoted by the possessive phrase in the description are not a subset of the objects denoted by the possessive phrase in the query." The second rule intuitively says that, if there is no reason to believe that the objects denoted by the possessive phrase in the description are not a subset of the objects denoted by the possessive phrase in the query, then it must be true that the objects denoted by the possessive phrase in the description indeed are a subset of the objects denoted by the possessive phrase in the query. The rule is an instance of the Closed World Assumption, known in the art. Finally, the third rule says that it is not acceptable for an answer set of the program to not contain the atom subset(descr, query). This ensures that, if the program has an answer, then a match has been found between the possessive phrase in the query and the possessive phrase in the description.

The answer sets of Π are then computed using an off-the-shelf answer set solver such as SMODELS, DLV, or CMODELS. If Π is found to have at least one answer set, then it is concluded that the asset's description matches the query. If instead Π has no answer sets, then it is concluded that the asset does not match the query.

It is to be understood that the embodiments described above are merely illustrative of the present invention and that many variations of the above-described embodiments can be devised by one skilled in the art without departing from the scope of the invention. It is therefore intended that all such variations be included within the scope of the following claims and their equivalents.

PARTS LEST

100 System
110 Data processing system
120 Peripheral system
130 User interface system
140 Processor-accessible memory system
200 Start step
210 Perform syntactic analysis step
220 Contain possessive phrase test step
230 Identify possessor and possession category step
240 Identify denoted object step
250 Identify additional possessors and possession categories step
260 Generate additional possessive phrases step
270 Identify assets step
280 Get query step
290 End step
300 Social network
310 Object node
315 Object node
320 Relationship Arc
390 Gedcom file
400 Multi-media collection
401-408 Digital image file
410 Caption

The invention claimed is:

1. A computer-implemented method for identifying multi-media assets from a multi-media collection, the method implemented at least in part by a data processing system and comprising the steps of:
    receiving a search query, the search query, or a derivative thereof, including a possessive phrase, wherein the possessive phrase includes a possessor and a possession category;
    identifying a denoted object referred to by the possessive phrase using a predefined relationship database that establishes social relationships between objects;
    identifying one or more additional possessors of the denoted object using the predefined relationship database;
    generating one or more additional possessive phrases for the denoted objects relating the identified additional possessors to the denoted object; and
    identifying one or more multi-media assets from the multi-media collection containing the denoted object responsive to the one or more additional possessive phrases;
    wherein the step of identifying the multi-media assets includes the step of comparing the additional possessive phrases to metadata associated with multi-media assets in the multi-media collection, and wherein the metadata associated with the multi-media assets includes captions.

2. The method of claim 1, further comprising the step of pre-processing the search query to generate the possessive phrase, the pre-processed search query being a derivative of the search query.

3. The method of claim 2, wherein the search query includes an ambiguous possessive phrase, and the pre-processing transforms the ambiguous possessive phrase into a plurality of unambiguous possessive phrases, the generated possessive phrase being one of the plurality of unambiguous possessive phrases.

4. The method of claim 2, wherein the step generating the possessive phrase includes generating the possession category.

5. The method of claim 4, wherein the search query includes a first possession category, and wherein the pre-processing generates a second possession category that is a synonym of the first possession category, and wherein the generated possessive phrase includes the second possession category.

6. The method of claim 1, wherein the step of identifying the denoted object comprises the step of searching the relationship database to identify objects linked to the possessor via the possession category.

7. The method of claim 1, wherein the step of identifying the one or more additional possessors includes searching the relationship database to identify additional possessors linked to the denoted object via respective possession categories.

8. The method of claim 7, wherein each additional possessive phrase is identified at least by combining one of the identified additional possessors with its respective possession category.

9. The method of claim 1, wherein the captions include user-supplied captions.

10. The method of claim 1, wherein the possession category is father, mother, grandmother, grandfather, sister, brother, husband, wife, son, or daughter.

11. The method of claim 1 wherein the predefined relationship database is formed, at least in part, by importing information from a family tree database created using a genealogy software application.

12. The method of claim 1 wherein the one or more multi-media assets are identified, at least in part, using an answer set program.

* * * * *